(12) United States Patent
Ueda et al.

(10) Patent No.: US 8,542,443 B2
(45) Date of Patent: Sep. 24, 2013

(54) LIGHT REFLECTOR AND PLANAR LIGHT SOURCE DEVICE

(75) Inventors: Takahiko Ueda, Ibaraki (JP); Hiroshi Koyama, Ibaraki (JP)

(73) Assignee: Yupo Corporation, Tokyo (JP)

( * ) Notice: Subject to any disclaimer, the term of this patent is extended or adjusted under 35 U.S.C. 154(b) by 925 days.

(21) Appl. No.: 11/722,026

(22) PCT Filed: Dec. 16, 2005

(86) PCT No.: PCT/JP2005/023142
§ 371 (c)(1),
(2), (4) Date: Jan. 29, 2008

(87) PCT Pub. No.: WO2006/064907
PCT Pub. Date: Jun. 22, 2006

(65) Prior Publication Data
US 2008/0130295 A1 Jun. 5, 2008

(30) Foreign Application Priority Data
Dec. 17, 2004 (JP) ................................ 2004-366874

(51) Int. Cl.
*G02B 5/02* (2006.01)
*G02F 1/13357* (2006.01)
(52) U.S. Cl.
USPC ...... 359/599; 362/296.01; 362/341; 362/355; 362/609; 362/624
(58) Field of Classification Search
USPC .................... 359/599, 838, 883; 362/296.01, 362/355, 609, 623, 624, 341
See application file for complete search history.

(56) References Cited

U.S. PATENT DOCUMENTS

| | | | | |
|---|---|---|---|---|
| 4,643,518 | A | * | 2/1987 | Taniguchi ................. 359/218.1 |
| 5,126,873 | A | * | 6/1992 | Ang ........................... 359/217.1 |
| 5,672,409 | A | * | 9/1997 | Miyakawa et al. ........... 428/141 |
| 5,710,856 | A | * | 1/1998 | Ishii et al. ...................... 385/146 |
| 6,533,440 | B2 | * | 3/2003 | Koyama et al. .......... 362/296.04 |
| 6,914,719 | B2 | * | 7/2005 | Koyama et al. ............... 359/361 |
| 7,004,612 | B2 | * | 2/2006 | Takahashi et al. ............ 362/615 |
| 7,108,383 | B1 | * | 9/2006 | Mitchell ....................... 359/839 |
| 7,165,874 | B2 | * | 1/2007 | Nagakubo et al. ............ 362/623 |
| 7,285,327 | B2 | * | 10/2007 | Mimura et al. ............ 428/319.3 |
| 7,298,438 | B2 | * | 11/2007 | Ueda et al. .................... 349/113 |
| 7,344,283 | B2 | * | 3/2008 | Ueda et al. .................... 362/341 |
| 7,382,527 | B2 | * | 6/2008 | Kandaka et al. .............. 359/359 |

(Continued)

FOREIGN PATENT DOCUMENTS

| | | |
|---|---|---|
| EP | 0724181 A2 | 7/1996 |
| EP | 0724181 A3 | 7/1996 |

(Continued)

OTHER PUBLICATIONS

Office Action issued Apr. 12, 2011, in Japan Patent Application No. 2005-363036 (with English translation).

*Primary Examiner* — Ricky D Shafer
(74) *Attorney, Agent, or Firm* — Oblon, Spivak, McClelland, Maier & Neustadt, L.L.P.

(57) ABSTRACT

A light reflector of which the bidirectional reflectance R1 is from 90 to 120% when the light entrance angle is 15° and the light acceptance angle is 0°, and the bidirectional reflectance R2 is from 85 to 110% when the light entrance angle is 75° and the light acceptance angle is 0°. The light reflector has high reflectivity, and attains brightness improvement even in underlight-type backlights.

13 Claims, 2 Drawing Sheets

(56) References Cited

U.S. PATENT DOCUMENTS

| | | | |
|---|---|---|---|
| 7,489,846 B2* | 2/2009 | Grot et al. | 385/123 |
| 7,544,960 B2* | 6/2009 | Miyachi et al. | 250/504 R |
| 7,548,372 B2* | 6/2009 | Ueda et al. | 359/599 |
| 2003/0214718 A1 | 11/2003 | Kaminsky et al. | |
| 2004/0027702 A1 | 2/2004 | Matsushita et al. | |
| 2004/0036825 A1* | 2/2004 | Yoshii | 349/113 |
| 2005/0191464 A1 | 9/2005 | Takahashi et al. | |

FOREIGN PATENT DOCUMENTS

| | | |
|---|---|---|
| EP | 1 219 410 | 7/2002 |
| JP | 10 333133 | 12/1998 |
| JP | 11-242121 | 9/1999 |
| JP | 2000-329911 | 11/2000 |
| JP | 2002-31704 | 1/2002 |
| JP | 2002 254558 | 9/2002 |
| JP | 2002-258015 | 9/2002 |
| JP | 2002-341118 | 11/2002 |
| JP | 2003-191249 | 7/2003 |
| JP | 2003 262711 | 9/2003 |
| JP | 2005 31704 | 2/2005 |
| WO | 03 014778 | 2/2003 |
| WO | WO 03/104713 A1 | 12/2003 |
| WO | WO 2004/013664 A1 | 2/2004 |

* cited by examiner

LIGHT REFLECTOR AND PLANAR LIGHT SOURCE DEVICE

TECHNICAL FIELD

The present invention relates to a light reflector which is useful as a light-reflecting member for light reflector sheets for use in planar light source devices and for other reflectors and various lighting instruments, and to a planar light source device that comprises the light reflector, especially to an underlight-type planar light source device.

BACKGROUND ART

Backlight-type liquid-crystal displays with a built-in light source therein have been much popularized. Of such backlight-type built-in light sources, a typical structure of an underlight-type backlight comprises, as in FIG. 2, a housing 11 that serves both as a profile case and as a light reflector, a diffuser 14, and a light source 15 such as a cold-cathode lamp or LED. A typical structure of a sidelight-type backlight comprises, as in FIG. 3, a light waveguide with a dot print 12 on a transparent acrylic plate 13, a light reflector 11, a diffuser 14, and a light source 15 such as a cold-cathode lamp or LED. In these, the light from the light source is reflected on the light reflector (housing) 11, and forms uniform planar light though the diffuser 14. Recently, some improvements have been made also in light sources for lighting instruments by increasing their output power and by increasing the number of the light source lamps therein. For increasing the brightness of these devices with upsizing of displays, plural light sources may be disposed, as in FIG. 2.

Heretofore, white polyester films have been much used for the light reflectors for such applications (e.g. Patent Reference 1). However, a light reflector that comprises a white polyester film is often problematic in point of its discoloration (yellowing) owing to the recent increase in the quantity of light and to the increase in the ambient temperature by the heat from lamps, and materials that are less discolored have become desired.

To satisfy the requirement, a light reflector that comprises a white polyolefin film is proposed (e.g., Patent References 2 and 3). The light reflector that essentially comprises such a resin film is more lightweight and has more excellent workability and producibility as compared with other materials such as ceramics. The light reflector that comprises a white polyolefin film is characterized in that its discoloration is small as compared with a light reflector comprising a white polyester film (e.g., Patent References 4 and 5).

Using these light reflectors, some developments are made for the purpose of improving the brightness of edge light-type backlights (e.g., Patent Reference 6).

Patent Reference 1: JP-A-4-239540
Patent Reference 2: JP-A-6-298957
Patent Reference 3: JP-A-2002-31704
Patent Reference 4: JP-A-8-262208
Patent Reference 5: JP-A-2003-176367
Patent Reference 6: JP-A-002-341118

DISCLOSURE OF THE INVENTION

These days there is increasing a demand for increasing the brightness of underlight-type backlights with the tendency toward large-sized displays, and conventional light reflectors could not sufficiently satisfy the requirement. Accordingly, light reflectors having higher reflectivity are desired; and in particular, light reflectors capable of attaining an increase in the brightness of underlight-type backlights are desired.

The present invention is to realize a light reflector having a more increased brightness and therefore having a higher reflectivity than conventional light reflectors.

We, the present inventors have assiduously studied and, as a result, have come to provide a light reflector of the invention characterized by satisfying at least one of the following conditions (1) to (3):

(1) When the light entrance angle is 15° and the light acceptance angle is 0°, then the bidirectional reflectance R1 is from 90 to 120%; and when the light entrance angle is 75° and the light acceptance angle is 0° then the bidirectional reflectance R2 is from 85 to 110%;

(2) The relative brightness is from 112 to 150%;

(3) The light-reflecting face has a light-collecting function.

Preferably, the light reflector of the invention includes a substrate layer (A) that contains a thermoplastic resin and a filler and is stretched in at least one direction; and also preferably, the areal draw ratio is from 1.3 to 80 times. Also preferably, the light reflector comprises a laminate film having a light-diffusive layer (B) on at least one face of the substrate layer (A).

Preferably, the filler concentration in the substrate layer (A) is from 5 to 75% by weight, and the filler is an inorganic filler having a mean particle size of from 0.05 to 0.9 μm and/or an organic filler having a mean dispersed particle size of from 0.05 to 0.9 μm. Preferably, the filler concentration in the light-diffusive layer (B) is from 5 to 90% by weight, and the filler is an inorganic filler having a mean particle size of from 0.05 to 1.5 μm and/or an organic filler having a mean dispersed particle size of from 0.05 to 1.5 μm. Preferably, the filler is a surface-treated inorganic filler.

Preferably, the laminate film has a protective layer (C) on the face of the substrate layer (A) opposite to the face thereof having the light-diffusive layer (B) thereon; and preferably, the thickness of the light-diffusive layer (B) is from 0.5 to 20 μm.

Preferably, the cross section of the reflecting face that expresses a light-collecting function has a triangular prism-like profile; and also preferably, the prism-like profile is applied to the face through embossing.

Preferably, the porosity of the substrate layer (A) or the laminate film is from 15 to 60%. Also preferably, the thermoplastic resin to be used in the light reflector of the invention is a polyester resin or a polyolefin resin.

Further, the invention includes a planar light source device that comprises the above-mentioned light reflector.

The light reflector of the invention has high reflectivity and has excellent surface-emitting capability. The planar light source device produced by the use of the light reflector of the invention has high brightness and is extremely useful. According to the invention, especially the brightness of even an underlight-type backlight can be sufficiently increased.

BEST MODE FOR CARRYING OUT THE INVENTION

The constitution and the advantage of the light reflector of the invention are described in detail hereinunder. The description of the constitutive elements of the invention given hereinunder is for some typical embodiments of the invention, to which, however, the invention should not be limited. In the invention, the numerical range expressed by the wording "a number to another number" means the range that falls between the former number indicating the lowermost limit of the range and the latter number indicating the uppermost limit thereof.

[Characteristics of Light Reflector]

The light reflector of the invention is characterized by satisfying at least one of the following conditions (1) to (3):

(1) When the light entrance angle is 15° and the light acceptance angle is 0°, then the bidirectional reflectance R1 is from 90 to 120%; and when the light entrance angle is 75° and the light acceptance angle is 0°, then the bidirectional reflectance R2 is from 85 to 110%;

(2) The relative brightness is from 112 to 150%;

(3) The light-reflecting face has a light-collecting function.

The light reflector of the invention may satisfy at least one of the above conditions (1) to (3), but preferably it satisfies at least two of (1) to (3), more preferably all the conditions (1) to (3).

The bidirectional reflectance R1 and the bidirectional reflectance R2 in (1) are measured with a gonio-spectrometric color measurement system using a light having a wavelength of 550 nm. As in FIG. 5, R1 is measured in such a manner that the light entrance angle is 15° from the normal line direction of the sample surface and the light acceptance angle is 0° (in the normal line direction of the sample surface); and R2 is measured in such a manner that the light entrance angle is 75° from the normal line direction of the sample surface and the light acceptance angle is 0° (in the normal line direction of the sample surface). R1 and R2 are expressed as a relative value based on the bidirectional reflectance 100%, of a ceramic standard white plate. For the concrete process for their measurement, referred to is the description of Examples given hereinunder.

The bidirectional reflectance R1 of the light reflector of the invention is preferably from 90 to 120%, more preferably from 95 to 115%, even more preferably from 98 to 112%, still more preferably from 100 to 110%. The bidirectional reflectance R2 of the light reflector of the invention is preferably from 85 to 110% more preferably from 86 to 105%, even more preferably from 8 to 100%, still more preferably from 88 to 100%.

When the bidirectional reflectance R1 is at least 90% and the bidirectional reflectance R2 is at least 85%, then it is preferable since the brightness of the reflector in the lane direction is high. Basically, when the bidirectional reflectance is larger, then it is more preferable since the brightness in the plane direction is higher; but when the bidirectional reflectance is too large, then the production easiness and the production efficiency may lower. Accordingly, it is desirable that the bidirectional reflectance R1 is at most 120% and the bidirectional reflectance R2 is at most 110%.

For producing a light reflector having a bidirectional reflectance R1 of at least 90% and a bidirectional reflectance R2 of at least 85%, preferably employed is a method of making the reflector have a large number of light-scattering bodies of which the thickness is on the level of the wavelength size of visible light, inside it; or a method of laminating a large number of resin sheets each having a different refractive index and having a thickness on the level of the wavelength size of visible light. These methods may be suitably combined. Preferred is the method of making the reflector have a large number of light-scattering bodies of which the thickness is on the level of the wavelength size of visible light, inside it.

The relative brightness of (2) means a relative value (%) of the brightness of the light reflector, based on the brightness 100%, of Yupo Corporation's synthetic paper Yupo FPG200. The relative brightness may be measured by setting a light reflector at the position 11 of a 17-inches-size planar light source device, as in FIG. 2. For the concrete process for its measurement, referred to is the description of Examples given hereinunder.

The light reflector of the invention may have a relative brightness of from 112 to 150%, preferably from 113 to 125%, more preferably from 114 to 120%. Heretofore, a light reflector having a relative brightness of at least 112% could not be provided in a simple method, and therefore, the light reflector of the invention having a relative brightness of at least 112% is useful. In addition, the light reflector of the invention having a relative brightness of at most 150% is preferred in that its production is relatively easy.

For producing a light reflector having a relative brightness of at least 112%, preferably employed is a method of making the reflector have a large number of light-scattering bodies of which the thickness is on the level of the wavelength size of visible light, inside it; or a method of laminating a large number of resin sheets each having a different refractive index and having a thickness on the level of the wavelength size of visible light. These methods may be suitably combined. Preferred is the method of making the reflector have a large number of light-scattering bodies of which the thickness is on the level of the wavelength size of visible light, inside it.

The light-collecting function of (3) means a function of reflecting a light in the normal direction on the reflecting face of a light reflector. The matter as to whether or not a light reflector has a light-collecting function may be judged by applying a light to the light-reflecting face of a sample at a certain angle falling between −90° and +90° (that is the light entrance angle is from 0 to 90° from the normal line direction of the sample surface) and measuring the reflectance of the sample at the angle of the normal line direction relative to the light-reflecting face of the sample. For forming the light-reflecting face having a light-collecting functions employable is a method of forming a prism-like profile in the light-reflecting face or a method of aligning true spherical beads having a high refractive index in the surface of the light-reflecting face, as described hereinunder.

Satisfying at least one of the above conditions (1) to (3), the light reflector of the invention is not specifically defined in point of its structure.

One typical example of the light reflector of the invention has a laminate structure of at least two layers.

The laminate comprises at least a substrate layer (A) and a light-diffusive layer (B) or comprises at least a substrate layer (A) and a protective layer (C). One or more layers of light-diffusive layer (B) and protective layer (C) may exist in the laminate. For examples the laminate may comprise a substrate layer (A) laminated with a light-diffusive layer (B) on both surfaces thereof. It may comprise a substrate layer (A) and a light-diffusive layer (B), further having a protective layer (C) on the side opposite to the light-diffusive layer (B) or between the substrate layer (A) and the light-diffusive layer (B). Concrete examples of the laminate structure are (B)/(A), (B)/(A)/(B), (B)/(A)/(C), (B/(C)/(A), (B)/(C)/(A)/(C), (B)/(C)/(A)/(C)/(B).

The layers are individually described hereinunder.

[Substrate Layer (A)]

In general, the substrate layer (A) comprises essentially a thermoplastic resin, optionally containing a filler.

Thermoplastic Resin:

The type of the thermoplastic resin for use in the substrate layer (A) in the invention is not specifically defined. The thermoplastic resin (A) for use in the substrate film may be any thermoplastic resin including ethylenic resins such as high-density polyethylene, middle-density polyethylene, low-density polyethylene; propylenic resins; polyolefinic resins such as polymethyl-1-pentene, ethylene-cyclic olefin copolymer; polyamide resins such as nylon-6, nylon-6,6, nylon-6,10, nylon-6,12; thermoplastic polyester resins such as polyethylene terephthalate and its copolymer, polyethylene naphthalate, aliphatic polyester; and other thermoplastic resins such as polycarbonate, atactic polystyrene, syndiotactic polystyrene, polyphenylene sulfide. Two or more of these may be mixed for use herein.

Of those, preferred are polyolefinic resins or thermoplastic polyester resins in view of the chemical resistance and the production cost thereof; and more preferred are propylenic resins.

The propylenic resins include propylene homopolymers, and propylene-based copolymers with α-olefin such as ethylene, 1-butene, 1-hexene, 1-heptene, 4-methyl-1-pentene. The stereospecificity of the resins is not specifically defined. The resins may be isotactic or syndiotactic; and may have any desired degree of stereospecicity. The copolymers may be binary, ternary or quaternary ones, and may be random copolymers or block copolymers.

Preferably, the substrate layer (A) contains from 25 to 95% by weight, more preferably from 30 to 90% by weight, even more preferably from 35 to 65% by weight of such a thermoplastic resin. The thermoplastic resin content of at least 25% by weight in the substrate layer (A) may prevent surface scratches in stretching and forming the laminate film mentioned below, and the thermoplastic resin content of at most 95% by weight may readily provide a satisfactory degree of porosity of the film.

Filler:

For the filler to be in the substrate layer (A) in the invention along with the thermoplastic resin therein, usable are various inorganic fillers or organic fillers.

The inorganic filler includes heavy calcium carbonate, precipitated calcium carbonate, calcined clay, talc, titanium oxide, barium sulfates aluminium sulfates silica, zinc oxide, magnesium oxide, diatomaceous earth. In addition, those inorganic fillers processed with various surface-treating agents are also usable herein. Above all, heavy calcium carbonate, precipitated calcium carbonate and their surface-treated products, and clay and diatomaceous earth are preferred as they are inexpensive and facilitate the formation of pores in stretching. More preferred are heavy calcium carbonate and precipitated calcium carbonate that have been processed with various surface-treating agents. Preferred examples of the surface-treating agents are, for examples resin acids, fatty acids, organic acids, sulfuric ester-type anionic surfactants, sulfonic acid-type anionic surfactants, petroleum resin acids, their sodium, potassium or ammonium salts, and their fatty acid esters, resin acid esters, wax and paraffin. Also preferred are nonionic surfactants, dienic polymers, titanate-type coupling agents, silane-type coupling agents, and phosphate-type coupling agents. The sulfuric ester-type anionic surfactants are, for example, long-chain alcohol sulfuric esters, polyoxyethylene alkyl ether sulfuric esters, sulfurized oils, and their sodium or potassium salts. The sulfonic acid-type anionic surfactants are, for example, alkylbenzenesulfonic acids, alkylnaphthalene sulfonic acids, paraffin sulfonic acids, α-olefinsulfonic acids, alkylsulfosuccinic acids, and their sodium or potassium salts. The fatty acids are, for example, caproic acid, caprylic acid, pelargonic acid, capric acid, undecanoic acid, lauric acid, myristic acid, palmitic acid, stearic acid, behenic acid, oleic acid, linolic acid, linolenic acid, eleostearic acid; the organic acids are, for example, maleic acid, sorbic acid; the dienic polymers are, for example, polybutadiene, isoprene; the nonionic surfactants are polyethylene glycol ester-type surfactants. One or more these surface-treating agents may be used herein either singly or as combined. Methods for processing inorganic fillers with these surface-treating agents are described, for example, in JP-A-5-43815, JP-A-5-139728, JP-A-7-300568, JP-A-10-176079, JP-A-11-256144, JP-A-11-J-349846, JP-A-2001-158863, JP-A-2002-220547, JP-A-2002-363443, and these are usable herein.

The organic filler for use herein are immiscible ones having a melting point or a glass transition point (e.g., 120 to 300° C.) higher than the melting point or the glass transition point of the thermoplastic resin for use in the substrate layer (A). For example, its examples are polyethylene terephthalate, polybutylene terephthalate, polyamide, polycarbonate, polyethylene naphthalate, polystyrene, melamine resin, cyclic olefin homopolymer, copolymer of cyclic olefin and ethylene, polyethylene sulfide, polyimide, polyethyl ether ketone, polyphenylene sulfide.

One of the inorganic filler or the organic filler may be selected and may be used singly in the substrate layer (A); or two or more may be selected from those fillers and may be combined to be in the substrate layer. In case where two or more fillers are combined and used, then the inorganic filler and the organic filler may be mixed and used.

The mean particle size of the inorganic filler and the mean dispersed particle size of the organic filler may be determined, for example, according to a microtrack method, or through primary particle size observation with a scanning electronic microscope (in the invention, the mean value of the data of 100 particles is the mean particle size), or through specific surface area-based computation (in the invention, the specific surface area is measured with a powder specific area meter, Shimadzu's SS-100).

For suitably controlling the size of the pores to be formed in stretching the laminate film as will be mentioned hereinunder, the mean particle size of the inorganic filler and the mean dispersed particle size of the organic filler each are preferably from 0.05 to 0.9 μm, more preferably from 0.1 to 0.7 μm. When the filler having a mean particle size or a mean dispersed particle size of at most 0.9 μm is used, then more uniform pores will be easy to form in the film. When the filler having a mean particle size or a mean dispersed particle size of at least 0.05 μm is used, then predetermined pores will be easier to form in the film.

For suitably controlling the amount of the pores to be formed in stretching the laminate film as will be mentioned hereinunder, the filler content of the stretched film is preferably from 5 to 75% by weight, more preferably from 10 to 70% by weight, even more preferably from 35 to 65% by weight. The filler content of at least 5% by weight may readily provide a satisfactory degree of porosity of the film, and the filler content of at most 75% by weight may more effectively prevent surface scratches in the film.

Other Ingredients:

In accordance with the use of the light reflector of the inventions the substrate layer (A) may contain any other ingredients than the thermoplastic resin and the resin. For example, when the main resin that constitutes the substrate layer (A) is a propylenic resin, then a resin having a lower melting point than that of the propylenic resin, such as polyethylene or ethylene/vinyl acetate may be added thereto in an amount of from 3 to 25% by weight for improving the stretchability of the film.

Structure of Substrate Layer (A):

The substrate layer (A) that constitutes the light reflector of the invention may have a single-layered structure or a multi-layered structure. The thickness of the substrate layer (A) is preferably from 30 to 1000 μm, more preferably from 40 to 400 μm, even more preferably from 50 to 300 μm.

[Light-Diffusive Layer (B)]

A light-diffusive layer (B) may be formed only on the light-reflective face of the substrate layer (A) or on both faces thereof. However, the light-diffusive layer (B) may not be formed in the light reflector of the invention. In the invention, a laminate-structured film that has a light-diffusive layer (B) on at least one face of the substrate layer (A) therein is referred to as a laminate film. A method for forming the light-diffusive layer (B) includes a method that comprises co-extruding a starting melt material of the light-diffusive layer (B) through a multi-layer T-die or I-die before stretching formation of the substrate layer (A), and stretching the resulting laminate to form the intended layer; when the substrate layer (A) is a biaxially-stretched ones a method that comprises extruding a starting melt material of the light-diffusive layer (B) onto a monoaxially-stretched layer (A) and sticking the two, and then further monoaxially stretching the resulting laminate to form the intended layer; and a method that comprises forming the substrate layer (A) through stretching, and then extruding a starting resin melt of the light-diffusive layer (B) onto the layer (A) and sticking the two directly or via an adhesive layer therebetween to form the intended layer.

For the light-diffusive layer (B), the same thermoplastic resin and the same filler as those used in the substrate layer (A) may be used. When the particle size of the filler is nearer to the wavelength of visible light, then the light diffusibility of the layer may increase more. Accordingly, the particle size of the filler is preferably from 0.05 to 1.5 μm, more preferably from 0.1 to 0.9 μm, even more preferably from 0.2 to 0.7 μm. When the particle size of the filler is at least 0.05 μm, then it may facilitate the surface roughness formation and may improve the light diffusibility of the layer. When the particle size is at most 1.5 μm, then the surface roughness may be prevented from being larger and therefore the layer may readily keep its good light-diffusing capability. Regarding its amount, the filler concentration is preferably higher within a range capable of retaining the surface strength of the layer, thereby improving the light diffusibility of the layer. Concretely, the filler concentration is preferably from 5 to 90% by weight, more preferably from 30 to 80% by weight, even more preferably from 45 to 70% by weight. When the filler concentration is at least 5% by weight, then the surface roughness may be more easily formed and the layer may have better light-diffusing capability. When it is at most 90% by weight, then the layer may readily keep its practicable surface strength.

The thickness of the light-diffusive layer (B) is preferably from 0.5 to 20 μm, more preferably from 2 to 15 μm, even more preferably from 2 to 6 μm. When the thickness thereof is at least 0.5 μm, then the layer may readily have an improved light-diffusing capability and have an increased refractivity. When it is at most 20 μm, then the layer may hardly detract from the reflecting capability of the substrate layer and the reflector may keep a high reflectivity.

[Protective Layer (C)]

A protective layer (C) may be formed only on one face of the substrate layer (A) or on both faces thereof. It may also be formed between the substrate layer (A) and the light-diffusive layer (B), or may be formed as a surface layer of the light reflector. However, the protective layer (C) may not be formed in the light reflector of the invention.

A method for forming the protective layer (C) includes a method that comprises co-extruding a starting melt material of the protective layer (C) through a multi-layer T-die or I-die before stretching formation of the substrate layer (A), and stretching the resulting laminate to form the intended layer; when the substrate layer (A) is a biaxially-stretched one, a method that comprises extruding a starting melt material of the protective layer (C) onto a monoaxially-stretched layer (A) and sticking the two, and then further monoaxially stretching the resulting laminate to form the intended layer; and a method that comprises forming the substrate layer (A) through stretching, and then extruding a starting resin melt of the protective layer (C) onto the layer (A) and sticking the two directly or via an adhesive layer therebetween to form the intended layer.

For the protective layer (C), the same thermoplastic resin as in the substrate layer (A) may be used. The layer (C) may contain the above-mentioned filler, and the filler content therein is preferably from 0 to 20% by weight, more preferably from 0 to 10% by weight/even more preferably from 0 to 5% by weight, still more preferably from 0 to 3% by weight.

The thickness of the protective layer (C) is preferably at least 1 μm, more preferably from 2 to 30 μm, even more preferably from 3 to 20 μm. When the thickness is at least 1 μm, then the surface strength of the light reflector may be increased and the reflector may readily express its light-collecting effect when the layer is embossed.

[Additives]

If desired, the layers that constitute the light reflector of the invention may contain fluorescent brightener, heat stabilizer, light stabilizer, dispersant, lubricant. The heat stabilizer may be a steric-hindered phenol-type, or phosphorus-containing, or amine-type stabilizer, and its content may be from 0.001 to 1% by weight. The light stabilizer may be a stearic-hindered amine-type, or benzotriazole-type, or benzophenone-type light stabilizer, and its content may be from 0.001 to 1% by weight. The inorganic filler dispersant may be a silane-coupling agent, a higher fatty acid such as oleic acid or stearic acid, a metal soap, a polyacrylic acid, a polymethacrylic acid or their salt, and its content may be from 0.01 to 4% by weight.

[Shaping]

For forming the substrate layer (A) or the laminate film, employable is any ordinary monoaxially-stretching or biaxially-stretching method. Concretely, herein employable is a monoaxial-stretching method the comprises sheetwise extruding resin melt (s) through a single-layer or multi-layer T-die or I-die connected to a screw extruder, and then monoaxially stretching the resulting sheet in a mode of machine-direction stretching to be attained by utilizing the peripheral speed difference between multiple rolls; or a biaxial-stretching method that comprises a combination of the same step as in the monoaxial-stretching method and an additional step of cross-direction stretching to be attained in a tenter oven; or a simultaneous biaxial-stretching method to be attained by a combination of a tenter oven and a linear motor.

The stretching temperature is preferably lower by 2 to 60° C. than the melting point of the thermoplastic resin used, but is higher by 2 to 60° C. than the glass transition point of the resin. When the resin is propylene homopolymer (melting point, 155 to 167° C.) then the stretching temperature preferably falls between 95 and 165° C. When the resin is polyethylene terephthalate (glass transition point: about 70° C.), then the stretching temperature preferably falls between 100 and 130° C. The pulling rate for the stretching preferably falls between 20 and 350 m/min.

The obtained substrate layer (A) or laminate film may be optionally heat-treated (annealed) for promoting the crystallization thereof and for reducing the thermal shrinkage of the laminate film.

For suitably controlling the size of the pores to be formed in the substrate layer (A) or the laminate film, the areal draw ratio of the substrate layer (A) preferably falls between 1.3 and 80 times, more preferably between 7 and 70 times, even more preferably between 22 and 65 times, most preferably between 25 and 60 times. The areal draw ratio falling between 1.3 and 80 times readily forms fine pores in the film, not lowering the reflectivity of the film.

For suitably controlling the amount of the pores to be formed in the substrate film (A) or the laminate film, per a unit volume thereof, the degree of porosity is preferably from 15 to 60% more preferably from 20 to 55%. The "porosity" as referred to herein is meant to indicate the value calculated according to the following formula. In the formula, $\rho 0$ indicates the true density of the film, and $\rho$ indicates the density thereof (JIS-P8118). So far as the unstretched material does not contain much air, the true density is nearly equal to the density of the unstretched film.

$$\text{Porosity}(\%) = [(\rho 0 - \rho)/\rho 0] \times 100.$$

The density of the substrate layer (A) or the laminate film for use in the invention generally falls between 0.5 and 1.2 g/cm$^3$. Films having more pores have a smaller density and have a larger porosity. Films having a larger porosity may have improved surface-reflecting characteristics.

[Light Reflector]

The light reflector of the invention may be formed of only the above-mentioned substrate layer (A) or laminate film alone; or may comprise the above-mentioned substrate layer (A) or laminate film with any other suitable material added thereto. Examples of the suitable material are metal plate and PET film.

Light-Collecting Function:

Preferably, the light-reflecting face of the light reflector of the invention has a light-collecting function. In order that the light-reflecting face may express a light-collecting function, it is especially desirable that the cross section of the light-reflecting face has a triangular prism-like profile. A method for forming the prism-like profile includes, for example, a method that comprises embossing a UV-curable thermoplastic resin sheet with an embossing plate, and then curing it through irradiation with UV rays; a method of embossing a melt resin laminate with an embossing plate during the laminate formation; and a method of embossing a sheet under thermal pressure with an embossing plate. Of those, preferred is the method of embossing a sheet under thermal pressure.

The prism-like profile for expressing a light-collecting function has a prism pitch of at most 2000 µm, preferably from 1 to 1000 µm, more preferably from 10 to 500 µm. Also preferably, the prism profile is given under heat and pressure with an embossing roll so that the cross-sectional prism profile may be triangular and the prism apex angle may be from 40° to 170°.

Applications:

The light reflector of the invention is preferably used as a sidelight-type or backlight-type planar light source device. In particular, it is extremely useful as a backlight-type planar light source device.

A backlight-type liquid-crystal display device (e.g., liquid-crystal TV) that comprises the light reflector of the invention has a constitution as in FIG. 2, and it may efficiently reflect the light running to the light reflector from all directions, in the right angle direction relative to the light reflector. Accordingly, the liquid-crystal display device may give a natural feeling to the viewers, having a high brightness with no brightness unevenness. The light reflector of the invention may be used not only in such backlight-type liquid-crystal display devices but also in any other power-saving display devices which are not equipped with a built-in light source and in which room light is intended to reflect on the light reflector. In addition, it may be widely utilized for the back of indoor or outdoor lighting devices and for the back of decorative illumination signboards.

EXAMPLES

The characteristics of the invention are described more concretely with reference to the following Examples and Comparative Examples. The material used, its amount and the ratio, the details of the treatment and the treatment process in the following Examples may be suitably modified or changed not overstepping the sprit and the scope of the invention. Accordingly, the invention should not be limitatively interpreted by the Examples mentioned below.

Example 1 and Example 2

The materials shown in Table 1 were mixed in a ratio as in Table 2 to prepare a composition (A), which was melt-kneaded in an extruder at 250° C. Next, this was sheetwise extruded out and cooled to about 60° C. with a chill roll to prepare a substrate layer (A). The substrate layer (A) was reheated at 145° C., and then stretched to the draw ratio as in Table 2 in the machine direction thereof by utilizing the peripheral speed difference between a number of rolls.

Compositions (B) and (C) prepared by mixing the materials shown in Table 1 in the ratio shown in Table 2 were separately melt-kneaded, and then melt-extruded onto both faces of the substrate layer (A) to form thereon a light-diffusive layer (B) and a protective layer (C), as laminated in an order of B/C/A/C. Next, the laminate was reheated at 160° C., and stretched to the draw ratio as in Table 2 in the cross direction thereof in a tenter. Next, this was annealed at 160° C. and then cooled to 60° C., and its edges were trimmed away to give a four-layered laminate film having a thickness as in Table 2. The laminate film is used as a light reflector.

Example 3

A composition (A) prepared by mixing the materials shown in Table 1 in the ratio shown in Table 2 was melt-kneaded in an extruder at 250° C. Next, this was sheetwise extruded out and cooled to about 60° C. with a chili roll to prepare a substrate layer (A). The substrate layer (A) was reheated at 145° C., and then stretched to the draw ratio as in Table 2 in the machine direction thereof by utilizing the peripheral speed difference between a number of rolls.

A composition (C) prepared by mixing the materials shown in Table 1 in the ratio shown in Table 2 was melt-kneaded, and then melt-extruded onto both faces of the substrate layer (A) to form thereon a protective layer (C) as laminated in an order of C/A/C. Next, the laminate was reheated at 160° C. and stretched to the draw ratio as in Table 2 in the cross direction thereof in a tenter. Next, this was annealed at 160° C. and then cooled to 60° C. and its edges were trimmed away to give a three-layered laminate film having a thickness as in Table 2. The laminate film is used as a light reflector.

Example 4

Using an embossing roll having an equilateral triangular cross-sectional profile having a depth of 58 µm and a pitch of 145 µm the light-reflecting face of the substrate obtained in Example 2 was embossed under a pressure of 100 kg, at 80° C. and at a line speed of 3 m/min, thereby producing a laminate film having a light-collecting function on its surface. The laminate film is used as a light reflector.

Example 5

A laminate film having a light-collecting function on its surface was obtained in the same manner as in Example 4, for which, however, the substrate obtained in Example 3 was used. The laminate film is used as a light reflector.

Comparative Example 1

Yupo Corporation's synthetic paper, Yupo's trade name "FPG200" is used as a light reflector.

Comparative Example 2

A substrate layer (A) composition, a surface layer (B) composition and a back layer (C) composition prepared by mixing the materials shown in Table 1 in the ratio shown in Table 2 were separately melt-kneaded in different three extruders at 250° C. Next, these were fed to one co-extrusion die, in which (B) and (C) were laminated on both faces of (A) then sheetwise extruded out and cooled to about 60° C. with a chill roll to obtain a laminate.

The laminate was re-heated at 145° C., then stretched to the draw ratio as in Table 2 in the machine direction thereof by utilizing the peripheral speed difference between a number of rolls, again re-heated up to about 150° C., and stretched to the draw ratio as in Table 2 in the cross direction thereof in a tenter. Next, this was annealed at 160° C. and then cooled to 60° C., and its edges were trimmed away to give a three-layered (B/A/C) light reflector having a thickness as in Table 2.

Comparative Example 3

Mitsui Chemical's trade name "WS180E" is used as a light reflector.

(Test Method)

Every light reflector sample was tested as follows. The results are shown in Table 3.

(1) Bidirectional Reflectance R1, R2:

The reflectance at a wavelength of 550 nm, as measured with Murakami Color Research Laboratory's "Gonio-Spectrophotometric Color Measurement System GCMS4", is bidirectional reflectance.

R1 was measured as follows: The light entrance angle was 15° from the normal line direction of the sample surface, and the light acceptance angle was 0°. Based on the bidirectional reflectance, 100%, of a ceramic standard white plate (this is a standard white plate attached to the gonio-spectrophotometer GCMS4), the bidirectional reflectance of the tested sample was expressed as its relative value, and this is R1.

Similarly, R2 was measured as follows: The light entrance angle was 75° from the normal line direction of the sample surface, and the light acceptance angle was 0°. Based on the bidirectional reflectance, 100%, of the ceramic standard white plate, the bidirectional reflectance of the tested sample was expressed as its relative value, and this is R2.

(2) Brightness:

A light reflector was set at the position 11 of the 17-inches-size planar light source device illustrated in FIG. 4, and an inverter unit by Harrison was connected to the cold-cathode lamp 15. A tubular current of 6 mA at 12 V was applied to the cold-cathode lamp, and the device was switched on for lighting. After 3 hours, the brightness was measured. A brightness meter 16 by Topcon (trade name, BM-71 was used for measuring the brightness. The distance between the part at which the brightness is determined and the planar light source device (the distance to the planar light source device in the normal line direction) was 50 cm. The brightness was measured at 9 points in all (measurement points 17). The data of those 9 points were averaged; and based on the brightness, 100%, of Yupo Corporation's synthetic paper Yupo (trade name "FPG200"), the resulting mean value was expressed as a relative value, and this is the relative brightness of the tested sample.

(3) Reflectance R3:

According to the method described in JIS-Z8722, condition d, the reflectance at a wavelength of 550 nm was measured.

TABLE 1

| Ingredient | Details |
|---|---|
| PP1 | propylene homopolymer [Japan Polychem Corporation's Novatec PP: EA8] (MFR (230° C., 2.16 kg load) = 0.8 g/10 min), melting point (167° C., DSC peak temperature) |
| PP2 | propylene homopolymer [Japan Polychem Corporation's Novatec PP: MA4] (MFR (230° C., 2.16 kg load) = 5 g/10 min), melting point (167° C., DSC peak temperature) |
| HDPE | high-density polyethylene [Japan Polyethylene Corporation's Novatec HD: HJ360] (MFR (190° C., 2.16 kg load) = 5.5 g/10 min), melting point (134° C., DSC peak temperature) |
| Calcium Carbonate (a) | heavy calcium carbonate having a mean particle size of 1.8 µm [Bihoku Funka Kogyo's Softon 1200] |
| Calcium Carbonate (b) | surface-treated precipitated calcium carbonate having a mean particle size of 0.3 µm [Maruo Calcium's Calfine YM30] |
| Calcium Carbonate (c) | heavy calcium carbonate having a mean particle size of 0.97 µm [Maruo Calcium's Caltex 7] |
| Titanium Dioxide | titanium dioxide having a mean particle size of 0.2 µm [Ishihara Sangyo's CR-60] |

TABLE 2

| | Composition (wt. %) of Substrate Layer (A) | | | | Composition (wt. %) of Light-Diffusive Layer (B) | | | | Composition (wt. %) of Protective Layer (C) | | | |
|---|---|---|---|---|---|---|---|---|---|---|---|---|
| | PP-1 | HDPE | CaCO₃ | TiO₂ | PP-2 | HDPE | CaCO₃ | TiO₂ | PP-2 | HDPE | CaCO₃ | TiO₂ |
| Example 1 | 51 | 4 | 40 (b) | 5 | 40 | — | 59 (b) | 1 | 40 | — | 59 (b) | 1 |
| Example 2 | 51 | 4 | 40 (b) | 5 | 40 | — | 59 (b) | 1 | 100 | — | — | — |
| Example 3 | 51 | 4 | 40 (b) | 5 | — | — | — | — | 100 | — | — | — |
| Example 4 | 51 | 4 | 40 (b) | 5 | 40 | — | 59 (b) | 1 | 100 | — | — | — |
| Example 5 | 51 | 4 | 40 (b) | 5 | — | — | — | — | 100 | — | — | — |
| Comparative Example 1 | Yupo Corporation's trade name "FPG200" | | | | | | | | | | | |

| | | | | | Composition (wt. %) of Surface Layer (B) | | | | Composition (wt. %) of Surface Layer (C) | | | |
|---|---|---|---|---|---|---|---|---|---|---|---|---|
| Comparative Example 2 | 50 | 10 | 30 (c) | 10 | 97 | — | 2.5 (a) | 0.5 | 97 | — | 2.5 (a) | 0.5 |
| Comparative Example 3 | Mitsui Chemical's trade name "Refstar WS180E" | | | | | | | | | | | |

| | Layer Thickness (μm) | Layer Constitution | Draw Ratio in Stretching | | Areal Draw Ratio (times) | Thickness of Substrate Layer (A) (μm) |
|---|---|---|---|---|---|---|
| | | | machine direction (times) | cross direction (times) | | |
| Example 1 | 3/10/200/13 | B/C/A/C | 4.5 | 8.5 | 38.3 | 200 |
| Example 2 | 3/10/200/13 | B/C/A/C | 4.5 | 8.5 | 38.3 | 200 |
| Example 3 | 13/200/13 | C/A/C | 4.5 | 8.5 | 38.3 | 200 |
| Example 4 | 3/10/200/13 | B/C/A/C | 4.5 | 8.5 | 38.3 | 200 |
| Example 5 | 13/200/13 | C/A/C | 4.5 | 8.5 | 38.3 | 200 |
| Comparative Example 1 | Yupo Corporation's trade name "FPG200" | | | | | |
| Comparative Example 2 | 0.5/169/0.5 | B/A/C | 4.2 | 8.5 | 35.7 | 169 |
| Comparative Example 3 | Mitsui Chemical's trade name "Refstar WS180E" | | | | | |

TABLE 3

| | 550 nm Reflectance (%) | Bidirectional Reflectance | | Brightness (%) | Porosity (%) |
|---|---|---|---|---|---|
| | | R1 (%) | R2 (%) | | |
| Example 1 | 99.8 | 100.0 | 95.0 | 115 | 50 |
| Example 2 | 99.3 | 100.0 | 92.0 | 113 | 46 |
| Example 3 | 98.8 | 103.0 | 85.0 | 114 | 46 |
| Example 4 | 99.3 | 105.0 | 95.0 | 118 | 46 |
| Example 5 | 98.8 | 108.0 | 88.0 | 117 | 46 |
| Comparative Example 1 | 95.0 | 95.0 | 84.0 | 100 | 31 |
| Comparative Example 2 | 97.5 | 99.0 | 83.0 | 108 | 40 |
| Comparative Example 3 | 98.5 | 101.0 | 84.0 | 111 | — |

INDUSTRIAL APPLICABILITY

The light reflector of the invention has high reflectivity and has excellent surface-emitting capability. The planar light source device produced by the use of the light reflector of the invention has high brightness and is extremely useful. According to the inventions especially the brightness of even an underlight-type backlight can be sufficiently increased, and the light reflector may be widely utilized for the back of indoor or outdoor lighting devices and for the back of decorative illumination signboards. Accordingly, the industrial applicability of the invention is high.

Figure 1:
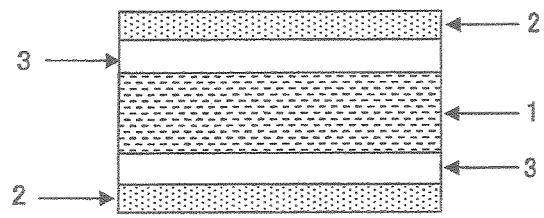
FIG. 1 It is a cross-sectional view of a laminate that constitute a light reflector of one embodiment of the invention.
Figure 2:
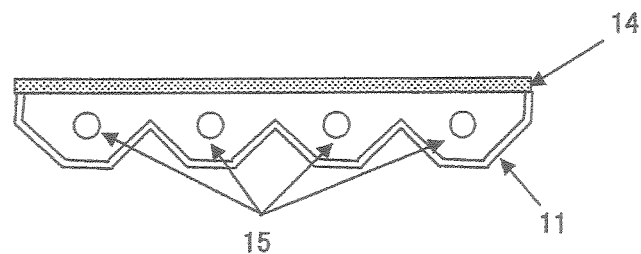
FIG. 2 It is a cross-sectional view showing a typical constitution of an underlight-type backlight.
Figure 3:
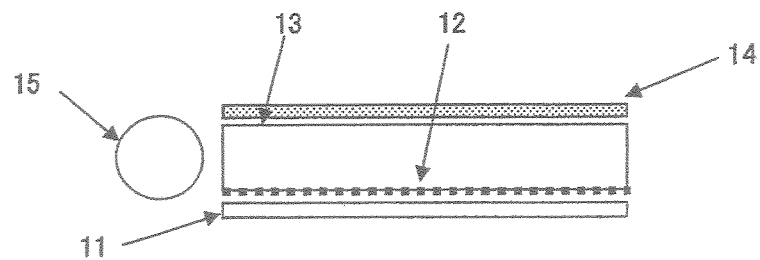
FIG. 3 It is a cross-sectional view showing a typical constitution of a sidelight-type backlight.
Figure 4:
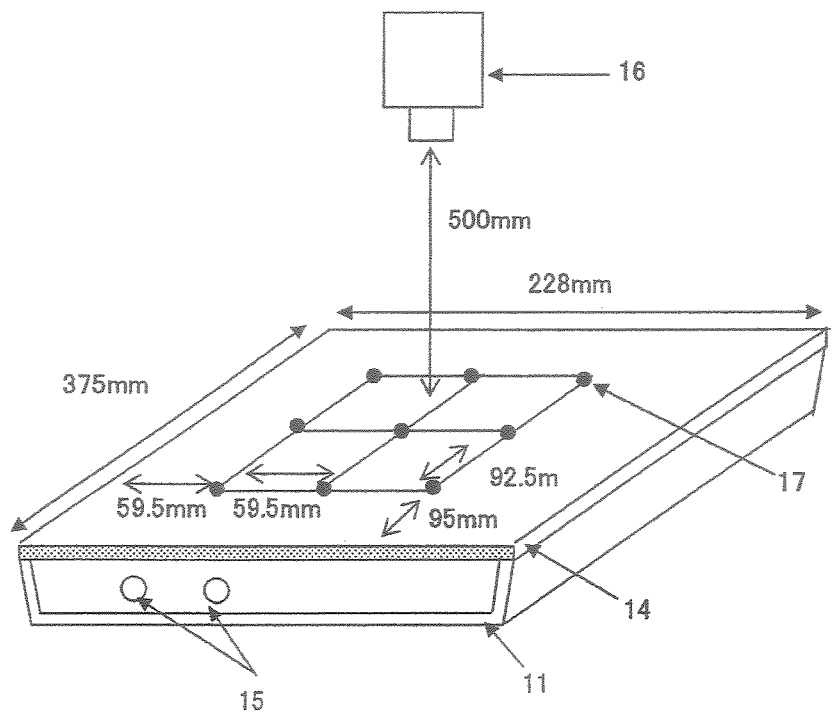
FIG. 4 It is a perspective view for explaining a method for brightness measurement.
Figure 5:
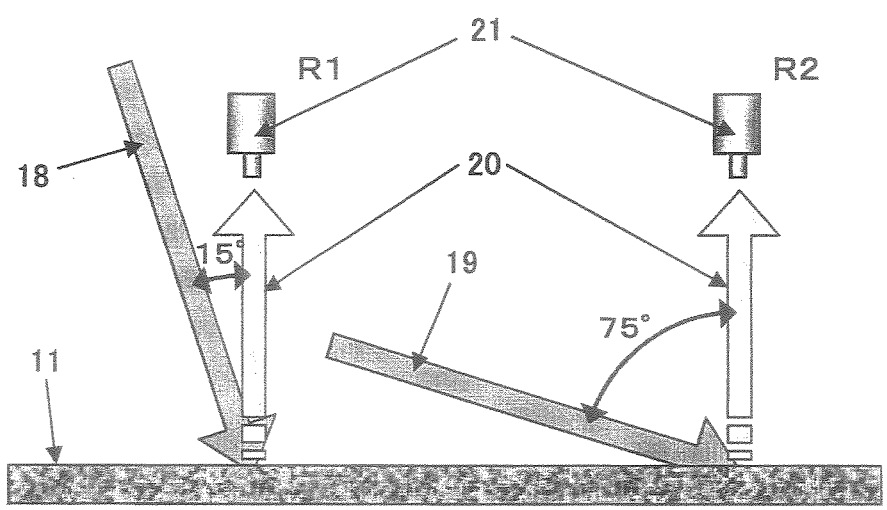
FIG. 5 It is a cross-sectional view for explaining a method for measurement of the bidirectional reflectance of a light reflector.

In the drawings, 1 is a substrate layer (A) 2 is a protective layer (C), 3 is a light-diffusive layer (B) 11 is a light reflectors 12 is a dot prints 13 is a transparent acrylic plate, 14 is a diffusers 15 is a light sources 16 is a brightness meters 17 is a point for measurements 18 is an entrance light (entrance angle 15°) 19 is an entrance light (entrance angle 75°), 20 is a reflected light in the normal tine direction (vertical direction of the reflecting face of a light reflector, is an acceptance part.

The invention claimed is:

1. A light reflector, comprising:
    a substrate layer comprising a polyolefinic resin and a filler and stretched in at least one direction; and
    a light-diffusive layer including a filler in a concentration of from 45 to 70% by weight,
    wherein the substrate layer has a bidirectional reflectance R1 which is from 90 to 120% with respect to a bidirectional reflectance of a ceramic standard white plate, when a light entrance angle is 15° and a light acceptance angle is 0°, the substrate layer has a bidirectional reflectance R2 which is from 85 to 110% with respect to a bidirectional reflectance of a ceramic standard white plate, when the light entrance angle is 75° and the light acceptance angle is 0°, the light entrance angle and the light acceptance angle are angles with respect to a normal line direction of a surface to which light is applied, and the filler in the light-diffusive layer comprises at least one material selected from the group consisting of an inorganic filler having a mean particle size of from 0.2 to 0.7 μm and an organic filler having a mean dispersed particle size of from 0.2 to 0.7 μm.

2. The light reflector according to claim 1, wherein the substrate layer has a relative brightness of from 112 to 150% with respect to a brightness of synthetic paper used as a standard.

3. The light reflector according to claim 1, wherein the substrate layer has a light-reflecting face which has a light-collecting function.

4. The light reflector according to claim 1, wherein the substrate layer is stretched to an areal draw ratio of from 1.3 to 80 times.

5. The light reflector according to claim 1, wherein the light-diffusive layer is included in a laminate film formed on at least one face of the substrate layer.

6. The light reflector according to claim 5, wherein the filler in the light-diffusive layer includes the inorganic filler and the organic filler.

7. The light reflector according to claim 5, wherein the laminate film has a protective layer on a face of the substrate layer opposite to the face having the light-diffusive layer.

8. The light reflector according to claim 5, wherein the light-diffusive layer has a thickness which is from 0.5 to 20 μm.

9. The light reflector according to claim 5, wherein the laminate film has a porosity of from 15 to 60%.

10. The light reflector according to claim 1, wherein the filler in the substrate layer is in a concentration of from 5 to 75% by weight and is at least one material selected from the group consisting of an inorganic filler having a mean particle size of from 0.05 to 0.9 μm and an organic filler having a mean dispersed particle size of from 0.05 to 0.9 μm.

11. The light reflector according to claim 1, wherein the filler in the substrate layer is a surface-treated inorganic filler.

12. The light reflector according to claim 1, wherein the substrate layer has a porosity of from 15 to 60%.

13. A planar light source device comprising the light reflector of claim 1.

* * * * *